United States Patent Office 2,967,867
Patented Jan. 10, 1961

2,967,867
VAT DYES OF ANTHRAQUINONE-BIS-TRIAZOLE SERIES

Asa W. Joyce, Millersville, Md., assignor to American Cyanamid Company, New York, N.Y., a corporation of Maine No Drawing. Filed May 7, 1959, Ser. No. 811,525

6 Claims. (Cl. 260—308)

This invention relates to new dyes of the bis-amino-anthraquinonyltriazole series. More specifically, this invention relates to new compounds of the formula

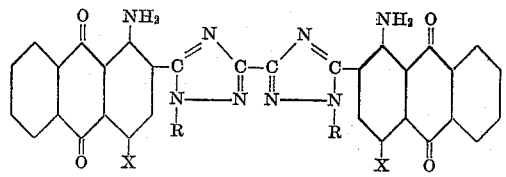

in which R may be hydrogen or a lower alkyl and X may be hydrogen, nitro, chloro, bromo, amino or aromatic carboxylic acylamido.

I have found a new class of vat dyes which gives superior color value and light fastness and has the further advantage of giving a wide variety of shades and colors. This class of dyestuffs is defined by the formula above.

Certain generalizations can be made as to the shades to be obtained within this class. Thus, where X is hydrogen or one of the halogens, the color will be some shade of red. When X is amino or acylamido, the color will be blue to gray depending on the acylating agent. Simple acylating agents such as the benzoyl group will give blues. The shade may be shifted toward the green by using negatively substituted acylating agents such as meta-trifluoromethyl benzoyl or thenoyl chloride. Shades of gray varying from blue-gray to pure grays may be obtained by using acylating agents derived from the carboxylic acids of anthraquinone and other vattable nuclei. When X is nitro, the process of vatting the dyestuff to place it upon the fiber causes the reduction of the nitro group to a free amino group and, consequently, the dyes where X is nitro are to be classified with the blue dyes.

The new dyes of my invention may be conveniently prepared by the reaction of 3,4-phthaloyl-isatoic anhydrides with oxamide dihydrazone followed by ring closure. This gives the dye defined above where X and R are both hydrogen. This dye may then be used as an intermediate for other dyes of the invention. For example, where X is halogen the dyes are prepared by halogenation of the above dye with the proper halogenating agent such as chlorine or bromine. When X is nitro or amino the primary dyestuff prepared above may be nitrated by conventional methods and the nitro group reduced by conventional methods to give amino compounds. Acylation of the amino group gives the acylamido derivatives. At any point the R may be converted from hydrogen to alkyl by reaction with an alkylating agent, although this is preferably done in the beginning. This inter-relation with these compounds may be illustrated by the following schematic series of equations

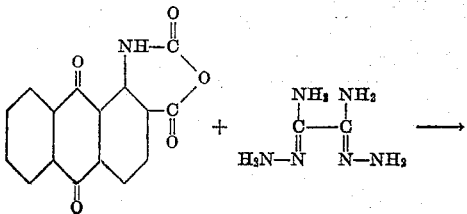

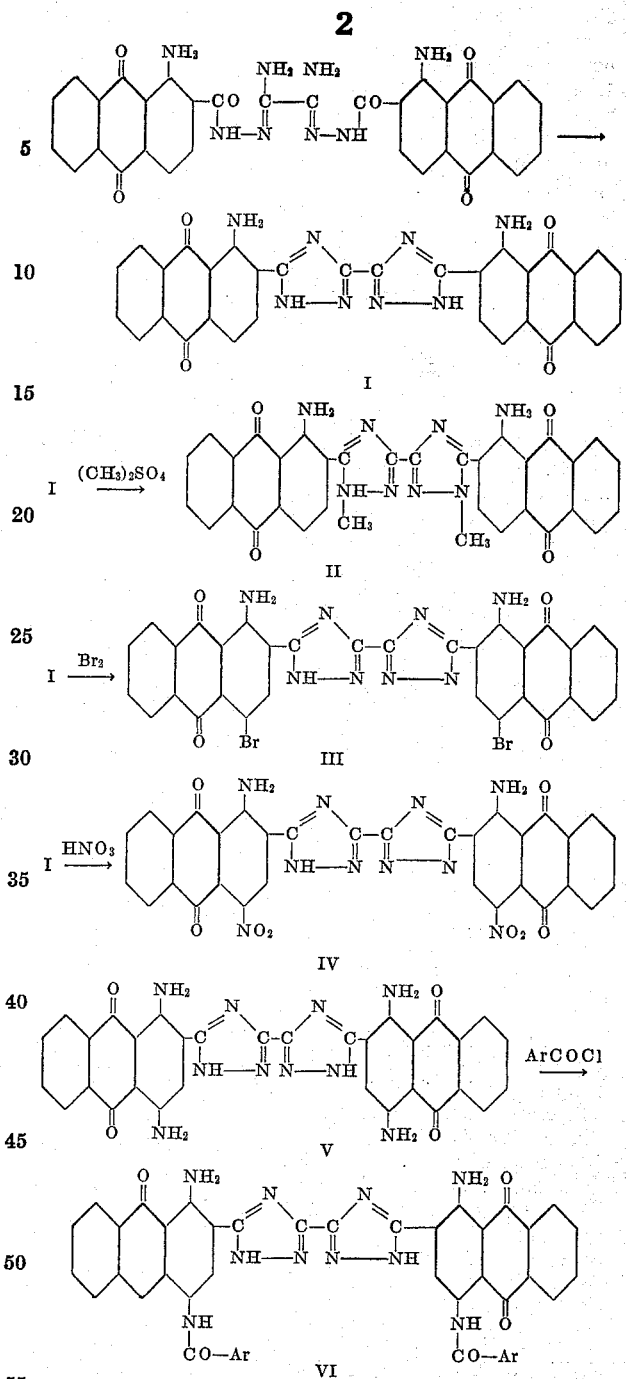

Compound II can be brominated or nitrated similarly to Compound I or alternatively Compounds III, IV, or VI can be alkylated. Other alkylating agents, of course, will give homologous alkyl derivatives.

The group Ar-COCl in the above series of equations represent an aromatic carboxylic acid chloride which is used as the acylating agent to prepare the acylamido derivatives of our invention. The aromatic acid from which this is derived may be any one of a number of simple or complex aromatic acids such as benzoic acid and its derivatives; toluic acid, methoxybenzoic acid, dimethoxybenzoic acid, chlorobenzoic acid, dichlorobenzoic acid, meta-methyl sulfonylbenzoic acid, para-methyl-sulfonylbenzoic acid, meta-trifluoromethylbenzoic acid, and the like, naphthoic acids and their derivatives, thenoic acid and its derivatives such as 5-methylthenoic acid, 5-bromothenoic acid and the like; pyridinecarboxylic acids such as picolinic acid, nicotinic acid and the like. It may also itself contain a vattable residue, such as anthraquinone-2-carboxylic acid, 1-aminoanthraquinone-2-carboxylic acid, 1,4-diaminoanthraquinone-2-carboxylic acid, 1,9-isothiazoloanthraquinone-2-carboxylic acid, 1,9-pyrazolanthrone-2-carboxylic acid and the like.

My invention may be illustrated by the following examples in which parts are by weight unless otherwise specified.

*Example 1*

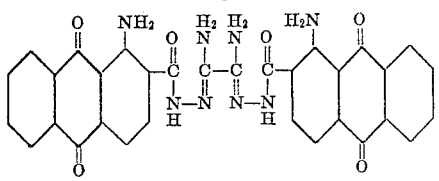

To a mixture of 14.7 parts of 3,4-phthaloylisatoic anhydride, 140 parts of nitrobenzene and 5 parts of pyridine at 150° C. is added gradually 2.9 parts of oxamide dihydrazone. After stirring at 150–160° C. until reaction is substantially complete, the mixture is cooled to room temperature. The solid product is removed by filtration and washed with nitrobenzene and ethanol. It is then purified by extraction with boiling acetic acid, giving the product of the above formula in the form of a dark red solid. This dissolves in alcoholic potassium hydroxide to give a violet color.

The same compound may also be prepared by reacting 1-aminoanthraquinone-2-carbonyl chloride with oxamide dihydrazone or by reacting 1-nitroanthraquinone-2-carbonyl chloride with oxamide dihydrazone and subsequent reduction of the nitro group to amino with sodium sulfide.

*Example 2*

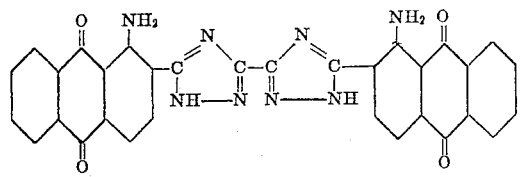

To 300 parts of polyphosphoric acid at 120° C. is added gradually 19 parts of the product of Example 1. The temperature is raised to 170–175° C. and held at this temperature until the reaction is substantially complete. The mixture is then cooled to 120° C. and drowned in 2000 parts of water. The crude solid dye is removed by filtration, washed until free of acid and then dried. The crude dye is purified by extraction with 70% sulfuric acid and treatment with an equal amount of sodium dichromate in 5–10% sulfuric acid at 80–90° C.

The new dye is a dark red solid which dissolves in concentrated sulfuric acid giving an orange color. The product dyes cellulosic fibers strong bright yellowish red shades from an olive alkaline hydrosulfite vat. The dye has excellent fastness properties.

*Example 3*

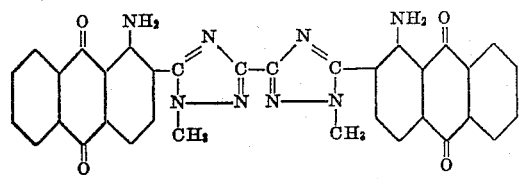

A mixture of 29 parts of a product of Example 2, 600 parts of nitrobenzene, 100 parts of triethylamine and 21 parts of potassium carbonate is heated to the boiling point and the mass is dehydrated by removing substantially all of the triethylamine. When this has been accomplished the temperature is reduced to 160° C. and 20 parts of methyl p-toluenesulfonate is added gradually in 4 equal portions. After the addition is complete, the mixture is stirred at 170–180° C. until reaction is substantially complete. After cooling and dilution with ethanol, the product is removed by filtration, washed with ethanol and water, and then dried.

The product is obtained in the form of a dark red powder which dissolves in concentrated sulfuric acid giving an orange color. This product dyes cotton in strong bright red shades from an olive vat, the shades being slightly bluer than those produced by the dyed product of Example 2. The alkyl groups are shown in a specific place in the triazole ring, but it is possible that other nitrogens may be alkylated, due to tautomerisim.

Similarly, the use of other lower alkyl esters of p-toluenesulfonic acid, such as the ethyl, propyl, butyl, or amyl ester in place of the methyl ester results in the formation of the corresponding higher alkyl derivative.

*Example 4*

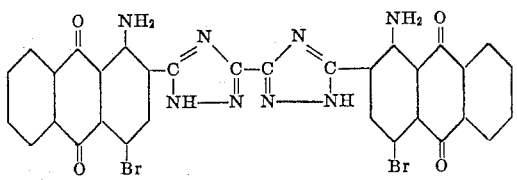

A mixture of 13 parts of the product of Example 2 and 250 parts of nitrobenzene is heated at 180–190° C. for a short time. It is then cooled to 50° C. and 10 parts of bromine and 0.2 part of iodine are added. The mixture is then heated at 55° C. until the reaction is substantially complete. After cooling to room temperature the solid product is removed by filtration and washed with alcohol. The product dyes cotton a bluer shade of red from an olive vat than the product of Example 2.

Chlorination instead of bromination, using a slow stream of chlorine instead of adding the bromine as above, results in the corresponding dichloro compound.

When the product of Example 3 is used in place of the product of Example 2, a dibromo or dichloro compound with alkyl groups on the triazole rings is obtained.

*Example 5*

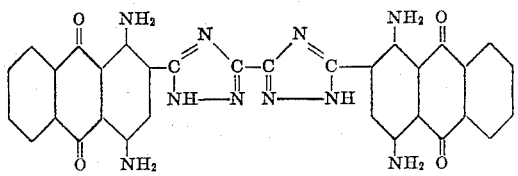

To 22 parts of 95% nitric acid (free from nitrous acid) cooled to −5° C., is added gradually 2.2 parts of the product of Example 2. The brown-red slurry is cooled at 0–5° C., until the reaction is complete. It is drowned in 150 parts of water and the yellow precipitate is removed by filtration and washed until acid-free. The wet cake of this product is reduced by heating in alkaline hydrosulfite solution and isolated after oxidation by aeration in the usual manner, giving the 1,4-diamino product. This product dyes cotton dull greenish-blue shades from a dark red vat.

The product of Example 3 can be similarly nitrated, giving the corresponding dimethyl derivative of the above product, dyeing cotton a greener shade of blue.

*Example 6*

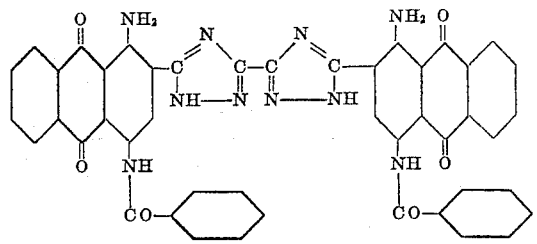

A mixture of 8 parts of the product of Example 5 in 200 parts of nitrobenzene is heated to 140° C. and to it is added slowly a mixture of 10 parts of benzoyl chloride, 20 parts of nitrobenzene and 1 part of pyridine. The reaction is completed by stirring the mixture at 140° C. After cooling, the product is removed by filtration and washed with nitrobenzene and ethanol and then dried. The product is obtained in the form of a dark blue powder which dissolves in concentrated sulfuric acid with an orange color and dyes cotton strong reddish-blue shades from a dark red vat.

Similarly, other acyl groups are introduced by using, in place of the benzoyl chloride, equivalent quantities of m-trifluoromethylbenzoyl chloride, m-methylsulfonylbenzoyl chloride, thenoyl chloride, nicotinoyl chloride, 2,4-dichlorobenzoyl chloride, 1-aminoanthraquinone-2-carboxy chloride and 1,9-isothiazoloanthraquinone-2-carboxy chloride. The shades obtained run from greener blues (e.g. thenoyl chloride or m-trifluoromethylbenzoyl chloride) to grays (the anthraquinone carboxy chlorides).

I claim:
1. Compounds of the formula

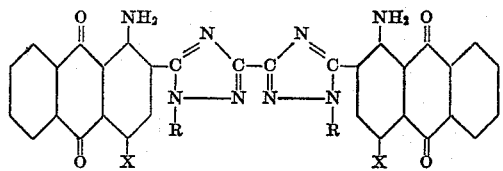

in which R is selected from the group consisting of hydrogen and lower alkyl, and X is selected from the group consisting of hydrogen, nitro, chloro, bromo, amino and aromatic carboxylic acylamido.

2. The compound of the formula

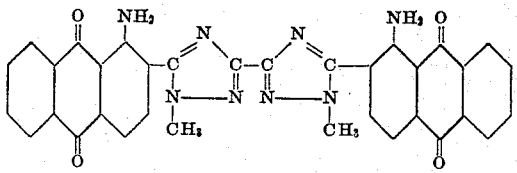

3. The compound of the formula

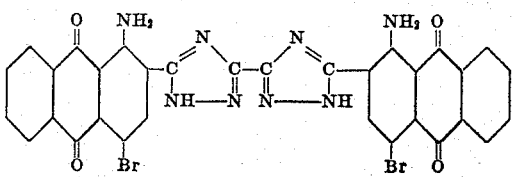

4. The compound of the formula

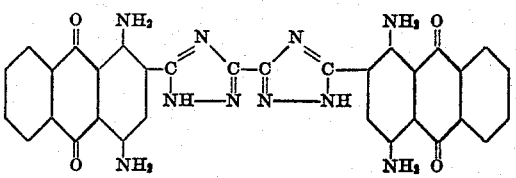

5. The compound of the formula

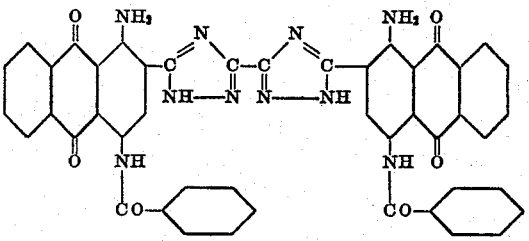

6. The compound of the formula

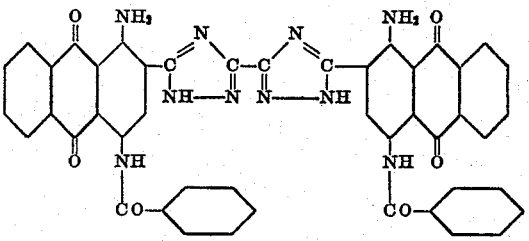

References Cited in the file of this patent

UNITED STATES PATENTS

| | | |
|---|---|---|
| 2,464,831 | Stillmar | Mar. 22, 1949 |
| 2,511,019 | Stillmar | June 13, 1950 |
| 2,629,718 | Belshaw et al. | Feb. 24, 1953 |
| 2,650,926 | Stillmar | Sept. 1, 1953 |

FOREIGN PATENTS

| | | |
|---|---|---|
| 1,001,992 | Germany | Feb. 7, 1957 |

UNITED STATES PATENT OFFICE
CERTIFICATION OF CORRECTION

Patent No. 2,967,867             January 10, 1961

Asa W. Joyce

It is hereby certified that error appears in the above numbered patent requiring correction and that the said Letters Patent should read as corrected below.

Column 2, lines 1 to 8, the formula should appear as shown below instead of as in the patent:

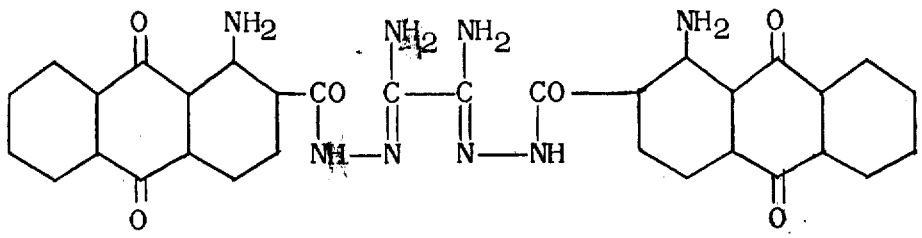

same column 2, lines 15 to 23, the formula should appear as shown below instead of as in the patent:

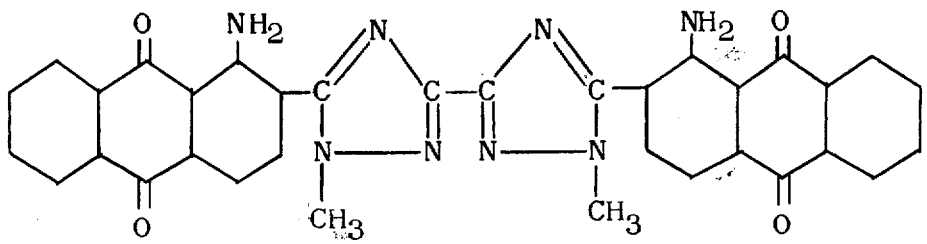

Signed and sealed this 8th day of August 1961.

(SEAL)
Attest:

ERNEST W. SWIDER
Attesting Officer

DAVID L. LADD
Commissioner of Patents